Oct. 14, 1969  A. S. DARUK ET AL  3,472,257
PNEUMATIC FORCE TRANSDUCER

Filed March 6, 1967  2 Sheets-Sheet 1

United States Patent Office 3,472,257
Patented Oct. 14, 1969

3,472,257
PNEUMATIC FORCE TRANSDUCER
Anany Stanislavovich Daruk, J. Ljubertsy, Oktyabrsky prospekt 60, kv. 8, Moskovskaya Oblast, U.S.S.R., and Vilgeny Alexandrovich Rukhadze, Leninsky prospekt 69, kv. 3, Moscow, U.S.S.R.
Filed Mar. 6, 1967, Ser. No. 620,952
Int. Cl. F15c 1/08, 1/12, 1/14
U.S. Cl. 137—81.5      1 Claim

ABSTRACT OF THE DISCLOSURE

A pneumatic force transducer for use in measuring instruments for measuring the parameter of liquids and gases, such as pressure, pressure drop, flow rate, level, temperature, density, etc. in which there is provided a balancing lever for sensing an input force and a mismatch indicator is operably coupled to the balancing lever. A relay type pneumatic amplifier is coupled to the mismatch indicator and a feedback means is included for the compensating lever and mismatch indicator and a relay-type pneumatic amplifier is operably connected with the mismatch indicator.

BACKGROUND OF INVENTION

This invention relates to devices capable of converting a force (or torque) into pressure of air and employed in compensation instruments for measuring various parameters preliminarily converted into a force (or torque).

This invention is especially effective when employed under high-temperature environmental conditions.

The conventional pneumatic force transducer comprises a lever coupled to a mismatch indicator and a feedback power element, wherein said mismatch indicator is connected to a pilot channel of a pneumatic amplifier, whose output signal is fed both to the feedback power element and to the transducer output. The design and principle of operation of such transducers are set forth, e.g. in books "Pneumoautomatic Elements for Heat Processes Control" by V. S. Prusenko, Gosenergoizdat, 1961, and "Pneumoautomatics" by M. D. Lemberg, Gosenergoizdat, 1961.

The disadvantages of the conventional pneumatic transducer are complicated amplifier design and unreliable operation, the linearity response affected by rigidity of elastic elements, large temperature errors, and hysteresis phenomena.

SUMMARY OF INVENTION

It is, therefore, an object of this invention to provide a pneumatic force transducer which is simple in design and reliable in operation.

It is another object of this invention to provide a pneumatic force transducer whose output characteristics do not depend on the rigidity of the elastic elements.

It is still another object of this invention to minimize temperature errors of the transducer.

The present invention resides in that in the pneumatic force transducer, in which a balancing lever and pneumatic amplifier are feedback coupled to a mismatch indicator, with the feedback power element being rigidly connected to said balancing lever, and a relay-type amplifier serves as a pneumatic amplifier.

It is expedient that the relay-type amplifier be fashioned as a jet amplifier provided with a feed nozzle and five channels connected thereto, the first of which is connected to the mismatch indicator, the second to the transducer output and to the third channel which is the positive feedback channel, with the fourth and fifth channels communicating with the atmosphere.

Other objects and advantages of the invention will be clearly understood from the following detailed description and exemplary embodiment thereof, reference being made to the accompanying drawings, wherein:

DETAILED DESCRIPTION OF INVENTION

Figure 1:
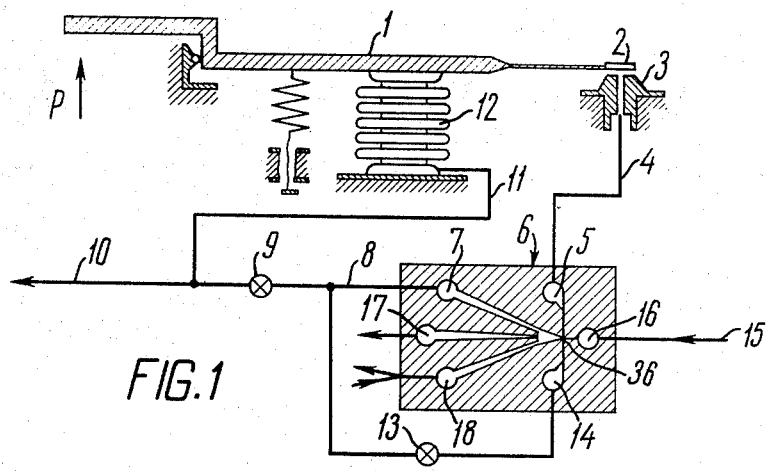
FIG. 1 is a circuit diagram of the pneumatic force transducer provided with a jet amplifier, according to the present invention.

The pneumatic force transducer comprises a double-arm balancing lever 1 (FIG. 1), on one end of which a gate valve 2 is fastened, and a nozzle 3 constituting together with said gate valve a mismatch indicator is mounted adjacent thereto. The nozzle 3 through a tube 4 is connected to a pilot channel 5 of a jet amplifier 6. An output channel 7 of the jet amplifier 6 communicates through a tube 8 via a throttle 9 with an output 10 of the transducer and through a tube 11 with a feedback bellows 12, and also through a throttle 13 with a channel 14 of a positive feedback. The feedback bellows 12 is rigidly connected to the lever 1. Feed pressure is supplied to a channel 16 of the amplifier 6 through a tube 15, and channel terminates in a working nozzle. Channels 17 and 18 of the jet amplifier 6 communicate with the atmosphere.

Figure 3:
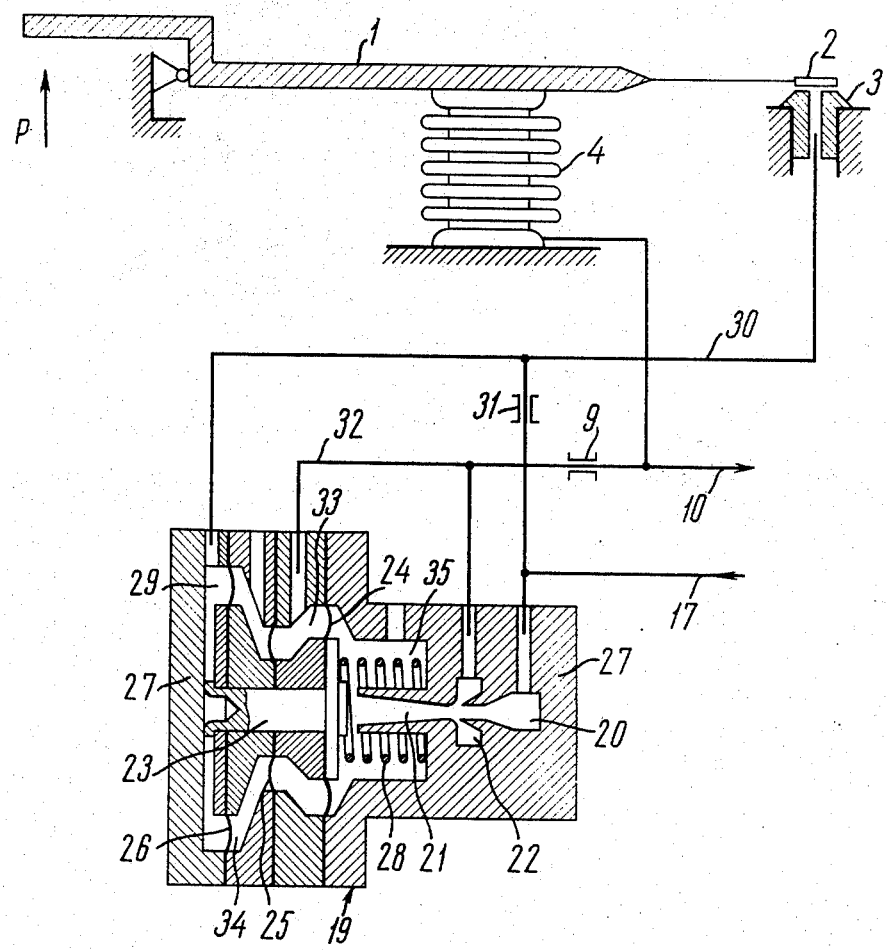
FIG. 3 is the circuit diagram of the pneumatic force transducer provided with a relay-type amplifier having diaphragm-type control, according to the invention.

FIG. 3 illustrates another embodiment of the pneumatic force transducer in which a relay-type pneumatic amplifier 19 is provided with a diaphragm-type control. The pneumatic amplifier 19 has a feed channel 20 in the form of a nozzle to which a feed pressure is applied, and a diffusor 21 which, together with a nozzle of the feed channel 20, defines the ejector pair provided with a cavity 22. The diaphragm-type control unit consists of a rigid center 23 carrying a positive feedback diaphragm 24, a pressurizing diaphragm 25 and a control diaphragm 26. A spring 28 is interposed between the rigid center 23 and a body 27 of the amplifier, and the spring serves to force the rigid center 23 away from the diffusor 21. A cavity 29, formed by the control diaphragm 26 and the body 27 communicates with the nozzle 3 through a tube 30. This line is fed through a throttle 31. The output signal of the amplifier 19 is the pressure in the cavity 22 which, through a tube 32 and the throttle 9, is fed to the feedback bellows 12 and to the output 10 of the transducer. In addition, the output signal of the amplifier 19 is delivered via tube 32 to a cavity 33 constituted by the diaphragms 24 and 25. A cavity 34 provided by the diaphragms 25 and 26 and a cavity 35 defined by the diaphragm 24 and the body 27 continuously communicate with the atmosphere.

The pneumatic force transducer functions as follows.

Provided the balancing lever 1 (FIG. 1) is not influenced by an input force P, and assuming the gate valve 2 closes the nozzle 3, a feed pressure is supplied to the channel 16 of the jet amplifier 6, and the flow of air ejected from the nozzle creates a rarefaction in cavity 36 where all the channels of the jet amplifier 6 meet, and such rarefaction causes air to be drawn in from the atmosphere through the channel 18. As the result of the action of the air flow upon the power flow drawn through the channel 18, and owing to a special profiling of side walls of the channel 7, the power flow is directed to the output channel 7, whereby air pressure starts increasing in the feedback bellows, with the result that the feedback force acts upon the lever 1 and turns the lever so that the gate valve 2 opens the nozzle 3.

The action of rarefaction in the cavity 36 draws in ambient air through the nozzle 3 and pilot channel 5. The flow thus originated acts upon the power flow in a direction opposite to the flow drawn through the channel 18. This results in the power flow being transferred from the output channel 7 to the channels 17 and 18, and upon rarefaction being created in the output channel 7 and in the feedback bellows 12, the rarefaction causes the lever 1 to shift so that the gate valve 2 closes the nozzle 3.

Further, the process is repeated as described above, and hunting takes place in the system.

Due to the throttle 9 and the capacity of the output line and of the feedback bellows 12 together forming an integrating link, a pressure is established in the feedback bellows 12 and in the output line of the transducer, with the value thereof being determined by the equilibrium of forces acting upon the lever 1.

Figure 2A:
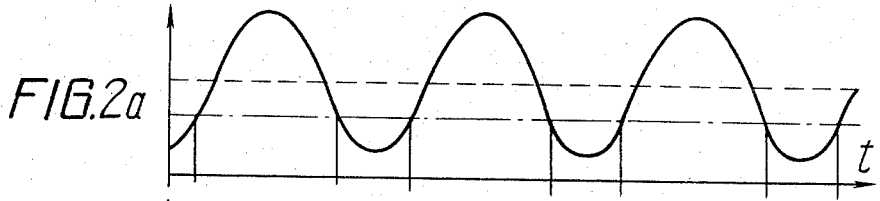
FIG. 2a shows the time dependence of the mismatch indicator gate valve travel.
Figure 2B:
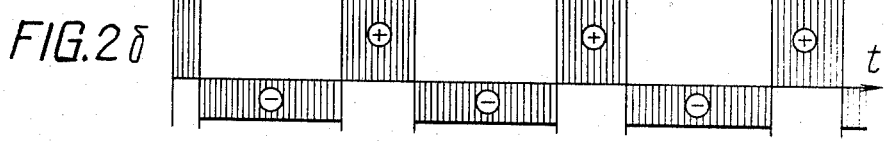
FIG. 2b shows the time dependence of the pressure value at the relay-type amplifier output.
Figure 2C:
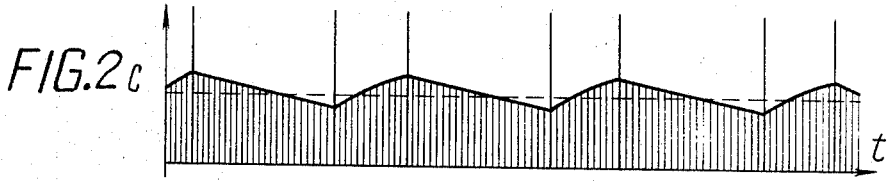
FIG. 2c shows time dependence of pressure value at the transducer output.

Graphically, the above processes are shown in FIGS. 2a, 2b, 2c; FIG. 2a shows the dependence of the gate valve 2 shifting on time. FIG. 2b shows the pressure variation at the output channel 7 of the amplifier 6 on time, and FIG. 2c the pressure variation at the output 10 of the transducer and the feedback bellows 12 on time. The variable output signal component can be reduced to any value by way of appropriate selection of the capacity of the output line and the throttle 9.

When the force P acts upon the lever 1, the equilibrium of forces acting upon the lever is disturbed, and the mismatch indicator assumes the position corresponding to the acting force. In this case, hunting is eliminated. This state lasts until the mean pressure in the feedback bellows 12 and at the output 10 change under the action of the signal produced by the amplifier 6 to balance the forces applied to the lever 1.

Upon rebalancing of the forces applied to the lever 1, hunting reappears in the system, and in the cavity of the feedback bellows 12 and at the output 10 of the transducer a pressure proportional to the force P applied to the lever 1 is established.

This cycling duty of the pneumatic force transducer reduces to a minimum the effect of variations in the rigidity of the system upon the transducer response. This is due to the fact that the lever 1 oscillates about a position which remains unchanged with variations of the input force and is determined by the position of the nozzle 3 of the mismatch indicator. This is why the additional temperature error is negligible, whereas in the conventional pneumatic transducers the temperature error arises due to variations in the rigidity of the elastic elements when the temperature varies.

The absence of the hysteresis phenomena, which is manifest in conventional pneumatic transducers, is likewise due to the cycling duty.

While the lever 1 passes through one cycle, the instantaneous pressure in the feedback bellows 12 is different during its direct and return travels. However, inasmuch as the transducer output signal proportional to the input force is the mean pressure in the feedback bellows 12 during the cycle, the hysteresis phenomena do not appear. This insures an increase in the accuracy of the transducer.

A peculiar design feature of the present pneumatic force transducer is that the relay-type jet amplifier can be made without movable elements. This considerably simplifies the design and increases reliability in operation as compared with pneumatic amplifiers used in conventional designs of the transducer. Moreover, the relay-type jet amplifier is the sole amplifying device capable of functioning normally under high temperatures, and the limit thereof is set by the physical and mechanical properties of the material from which the amplifier is made.

As has been stated above, the pneumatic force transducer with the relay-type jet amplifier can be successfully used in high-temperature transmitters of various parameters. The transducer can operate normally under any temperature within the range of 20 to 500° C. with a long service life. The maximum value of the additional temperature error does not exceed 0.7% per every 10° C. of temperature variation.

Under normal temperature conditions there are no variations of the output signal in the above described transducer, with on increase or decrease of the input force, and the effect of the rigidity of the measuring system upon the accuracy of the transducer is negligible.

What we claim is:

1. A pneumatic force transducer of the compensation type, comprising a transducer housing, a balancing lever for sensing an input force, a mismatch indicator having a movable element and a stationary element, said movable element being rigidly connected to said balancing lever, said stationary element being fixed to said transducer housing, a relay-type pneumatic amplifier connected to said stationary element, said relay-type pneumatic amplifier comprising a jet amplifier having a feeding nozzle and five channels communicating with said nozzle, the first of said channels communicating with the stationary element of said mismatch indicator, the second channel being connected via a throttle with the output of the transducer and the feedback power unit and directly connected with the third channel constituting a positive feedback of the pneumatic amplifier and said fourth and fifth channels being open to the atmosphere, a feedback power unit rigidly connected to said balancing lever and housing and embracing said lever mismatch indicator, amplifier and housing.

References Cited

UNITED STATES PATENTS

| | | | |
|---|---|---|---|
| 2,910,084 | 10/1959 | Frantz. | |
| 3,072,326 | 1/1963 | Rohmann et al. | 235—200 |
| 3,104,810 | 9/1963 | Lupfer | 235—200 |
| 3,124,999 | 3/1964 | Woodward | 137—81.5 XR |
| 3,131,601 | 5/1964 | Curran | 137—81.5 XR |
| 3,159,343 | 12/1964 | Hudson | 235—200 |
| 3,217,727 | 11/1965 | Spyropoulos | 137—81.5 |
| 3,219,049 | 11/1965 | Joesting | 235—200 XR |
| 3,302,398 | 2/1967 | Taplin et al. | 137—81.5 XR |

SAMUEL SCOTT, Primary Examiner